(12) United States Patent
Yoon

(10) Patent No.: US 11,240,679 B2
(45) Date of Patent: *Feb. 1, 2022

(54) MULTIDIMENSIONAL ANALYSIS AND NETWORK RESPONSE

(71) Applicant: T-Mobile USA, Inc., Bellevue, WA (US)

(72) Inventor: Jong Sung Yoon, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/878,000

(22) Filed: May 19, 2020

(65) Prior Publication Data

US 2020/0413266 A1 Dec. 31, 2020

Related U.S. Application Data

(63) Continuation of application No. 16/456,938, filed on Jun. 28, 2019, now Pat. No. 10,701,566.

(51) Int. Cl.
*H04W 16/22* (2009.01)
*H04W 16/28* (2009.01)
*H04L 12/24* (2006.01)

(52) U.S. Cl.
CPC ........ *H04W 16/225* (2013.01); *H04L 41/145* (2013.01); *H04L 41/147* (2013.01); *H04W 16/28* (2013.01)

(58) Field of Classification Search
CPC .. H04W 16/225; H04W 16/28; H04L 41/145; H04L 41/147
See application file for complete search history.

(56) References Cited

U.S. PATENT DOCUMENTS

| | | | |
|---|---|---|---|
| 2007/0054689 A1* | 3/2007 | Baker | H04W 52/08 455/522 |
| 2012/0295609 A1 | 11/2012 | Li et al. | |
| 2015/0264616 A1 | 9/2015 | Chen et al. | |
| 2016/0259062 A1* | 9/2016 | Raghupathy | G01S 19/21 |
| 2016/0286407 A1* | 9/2016 | Simonsson | H04W 72/085 |
| 2018/0321687 A1* | 11/2018 | Chambers | G06F 16/29 |

OTHER PUBLICATIONS

Pi et al., An Introduction to Millimeter-Wave Mobile Broadband System, Jun. 2011, IEEE Communication Magazine, pp. 101-107 (Year: 2011).*

(Continued)

*Primary Examiner* — Said M Elnoubi
(74) *Attorney, Agent, or Firm* — Lee & Hayes, P.C.

(57) ABSTRACT

The techniques describe herein involve receiving, from a user device, captured network data associated with an altitude and analyzing the network data at a network node. The network node can determine a coverage index associated with the altitude and compare the coverage index with an aggregated coverage index to determine a network response. The network response can include deploying and/or modifying a network component associated with the altitude. Additionally, the network node can update a multidimensional coverage map based on the coverage index and/or the network response.

20 Claims, 6 Drawing Sheets

(56) References Cited

OTHER PUBLICATIONS

Pi et al., An Introduction to Millimeter-Wave Mobile Broadband System, IEEE Communication Magazine, Jun. 2011, pp. 101-107 (Year: 2011).*

Office Action for U.S. Appl. No. 16/456,938, dated Oct. 29, 2019, Yoon, "Multidimensional Analysis and Network Response", 29 pages.

Pi, et al., "An Introduction to Millimeter-Wave Mobile Broadband Systems", IEEE Communications Magazine, Jun. 2011, Samsung Electronics, Topics in Radio Communications, pp. 101-107.

* cited by examiner

MULTIDIMENSIONAL ANALYSIS AND NETWORK RESPONSE

CROSS REFERENCE TO RELATED APPLICATIONS

This is a continuation application which claims priority to commonly assigned, U.S. patent application Ser. No. 16/456,938, filed Jun. 28, 2019. Application Ser. No. 16/456,938 is fully incorporated herein by reference.

BACKGROUND

Modern telecommunication systems include heterogeneous mixtures of second, third, fourth generation, and fifth generation (2G, 3G, 4G, 5G) cellular-wireless access technologies, which may be cross-compatible and may operate collectively to provide communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and 5G New Radio (NR) is an example of 5G telecommunications technologies.

Network coverage for modem telecommunications systems is often allocated, in part, using prediction analysis of infrastructure that considers a variety of factors, such as known cell tower location, power associated with the cell tower, and other factors. In addition, some coverage analysis may include considering network data associated with user devices. However, coverage analysis often cannot distinguish network data received from at differing altitudes.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods are directed to a user device configured to capture network data and a network device for analyzing the network data to evaluate network coverage and a network response to improve the network coverage. Current network coverage analysis can be based, in part, network data that considers a variety of factors, such as a known cell tower location, power associated with the cell tower, and other factors. In addition, some coverage analysis can include considering signal levels received by a user device, such as mobile phones and the like. However, received network data can be deficient and only include network data associated with a two-dimensional space.

In some examples, a user device can connect to a telecommunications network at a region and capture network data associated with the region. The same or a different user device can connect to the telecommunications network at the region while at a different altitude and capture different network data (e.g., a weaker or a stronger signal level) associated with the region. In some instances, the network coverage can differ at the different altitude and a coverage analysis can indicate an inconsistency because the network data can indicate differing coverage metrics at the same region.

By way of example and without limitation, a building can have a lower floor (e.g., a lobby) where a user device can connect to the telecommunications network with a stronger signal level and an upper floor (e.g., an observation deck) where the user device can connect to the telecommunications network with a lower signal level. Capturing an altitude can allow a prediction model to predict that the particular building at that location should have good network coverage but users at the upper floor can experience poor network coverage. Therefore, there can be geographic areas where a network device predicts network coverage that meets or exceeds a network coverage threshold at one altitude but does not predict network coverage that meets or exceeds the network coverage threshold at a different altitude. Accordingly, it is advantageous to capture network data at varying altitudes to determine geographic areas that have poor network coverage and analyze the network data to identify network responses to improve the network coverage at the varying altitudes.

Figure 1:
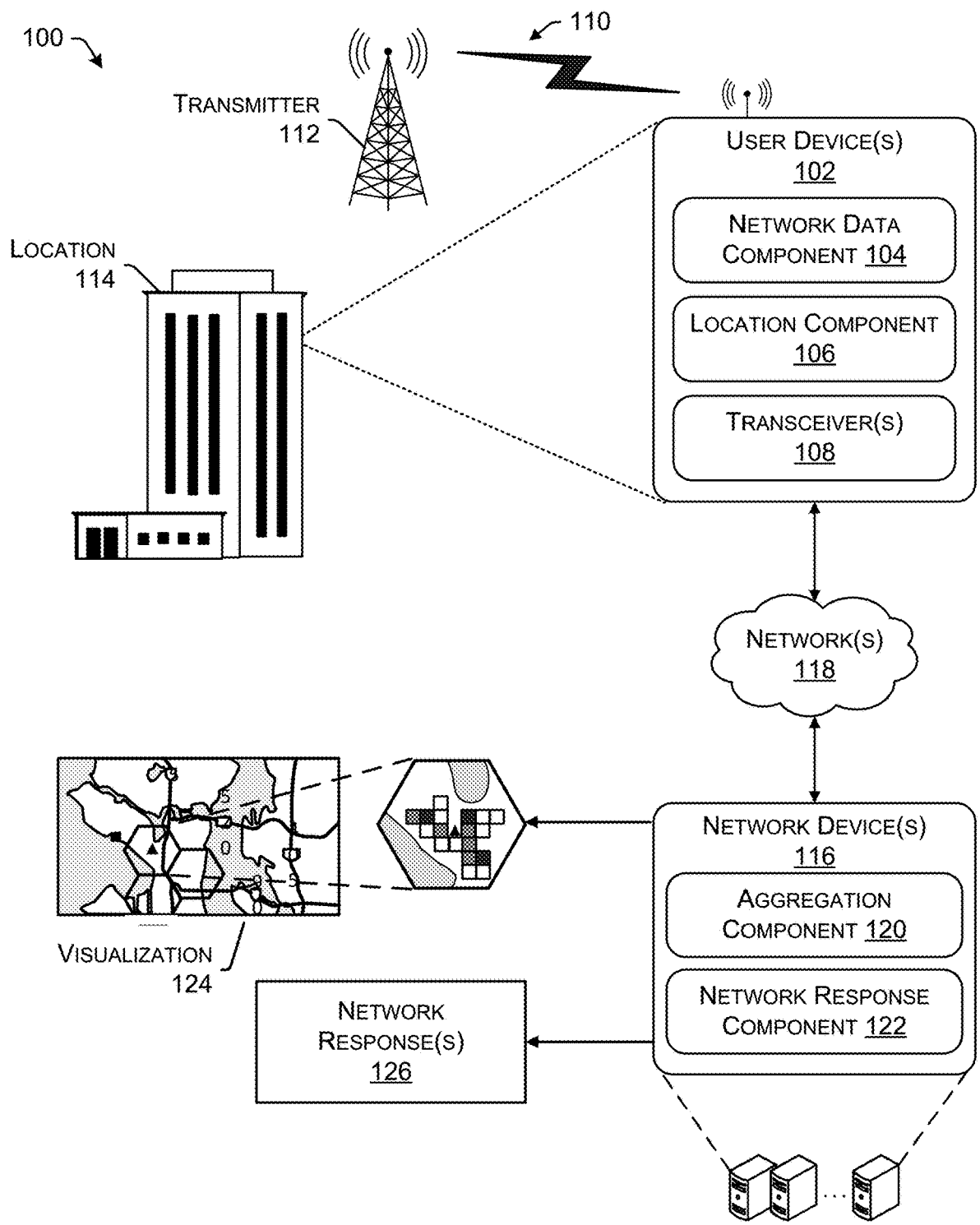
FIG. 1 illustrates an example environment including a user device that captures network data and transmits the network data to a network device.

FIG. 1 illustrates an example environment 100 including a user device(s) including a network data component and a location component to facilitate mobile collection of network data, as described herein.

In some instances, the user device(s) 102 can include a network data component 104, a location component 106, and one or more transceiver(s) 108. The user device(s) 102 can receive a signal 110 output by a transmitter 112 to determine signal data (also referred to as network data, one or more network metrics, or one or more network parameters) associated with the signal 110. In some instances, the user device(s) 102 can receive the signal 110 and analyze the signal 110, as discussed herein, independent of conducting any communications via the signal 110 and/or the transmitter 112. In some instances, the transmitter 112 can represent any one-directional or multi-directional wireless communication transceiver.

In some instances, the one or more transceiver(s) 108 can receive the signal 110 at the user device(s) 102, and the network data component 104 can determine metric(s) associated with the signal 110. For example, the metric(s) can include a received signal strength indication (RSSI), a reference signal received power (RSRP), a reference signal received quality (RSRQ), a signal-to-interference-plus-noise ratio (SINR), and/or a latency. Additionally, the metric(s) can include a channel identifier (e.g., channel 1, 2, . . . , N (where N is an integer)) and/or an indication of a frequency associated with a channel (e.g., 617-622 MHz, 622-627

MHz, 627-632 MHz, ..., 647-652 MHz, and the like). In some instances, the metrics can include network bandwidth, network throughput, and/or network latency, and the like. Of course, the example metrics, channels, and frequencies are examples and may vary depending on a particular implementation.

In some instances, the user device(s) 102 can receive a plurality of signals, for example, by tuning one or more filters associated with the transceiver(s) 108, to isolate a specific frequency of a signal (e.g., a known preferred provider signal for the area). Other techniques can be used to configure the user device(s) 102 to receive a range of frequencies.

The location component 106 of the user device(s) 102 can determine a location 114 of the user device(s) 102 and associate the location 114 with the signal 110. For example, the location component 106 can determine, using a location sensor (e.g., a GPS transceiver) a location 114 and associate the location 114 with the signal 110 and/or the metric(s) described above. Alternatively, or additionally, the location component 106 can determine the location 114 of the user device(s) 102 based on a nearby transmitter 112 or transmitters and/or Wi-Fi hotspots. For example, the user device(s) 102 can determine an identifier associated with transmitter 112 or a Wi-Fi hotspot (e.g., an SSID) and compare the identifier with map data indicating a location and/or a region associated with the identifier to determine the location 114 of the user device(s) 102.

The user device(s) 102 can communicate with network device(s) 116 via network(s) 118.

In some instances, the network device(s) 116 can include an aggregation component 120 and a network response component 122. The aggregation component 120 can receive the metric(s) from the user device(s) 102, as well as other user devices, and aggregate the metrics (depicted in FIG. 1 as visualization 124). The network response component 122 can analyze the aggregated metrics to determine a network response 126 based on the aggregated metrics. In some instances, and as discussed herein, the network response component 122 can determine locations of transmitters that are active and the estimated coverage associated with various heights, determine locations where to deploy base stations or other network devices, determine locations where a network signal is associated with poor quality, inform decisions regarding optimization of wireless transmissions (e.g., transmitter installation, transmitter adjustments, etc.), and the like. As can be understood, the aggregation component 120 and the network response component 122 are not limited to outputting the network response 126, and any number of visualizations or data can be utilized, as discussed herein.

Examples of the user device(s) 102 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user device(s) 102 include, but are not limited to, smart devices such as televisions, refrigerators, washing machines, dryers, smart mirrors, coffee machines, lights, lamps, temperature sensors, music players, headphones, or any other electronic appliances that can generate, request, receive, transmit, or exchange voice, video, and/or digital data over a network.

In some instances, the network device(s) 116 can be implemented as one or more communication servers to facilitate communications by and between the various devices in the environment 100. That is, the network device(s) 116 can represent any computing devices implementing various aspects of one or more of second, third, fourth generation, and fifth generation (2G, 3G, 4G, and 5G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the network device(s) 116 can implement GSM, UMTS, LTE/LTE Advanced, and/or NR telecommunications technologies. In some instances, the telecommunication technologies can be referred to generally as a radio access technology. Thus, a 5G network can represent a 5G radio access technology.

The network device(s) 116 can include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user device(s) 102, the network device(s) 116, and/or the network(s) 118. In some embodiments, the network device(s) 116 are operated by a service provider.

While FIG. 1 illustrates the network device(s) 116, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

Examples of the network(s) 118 can include, but are not limited to networks including second-generation (2G), third-generation (3G), fourth-generation (4G) cellular networks, such as LTE (Long Term Evolution), fifth-generation (5G) networks, and data networks, such as Wi-Fi networks.

In some instances, the user device(s) 102 can communicate with any number of user device(s), servers, network devices, computing devices, and the like.

Figure 2:
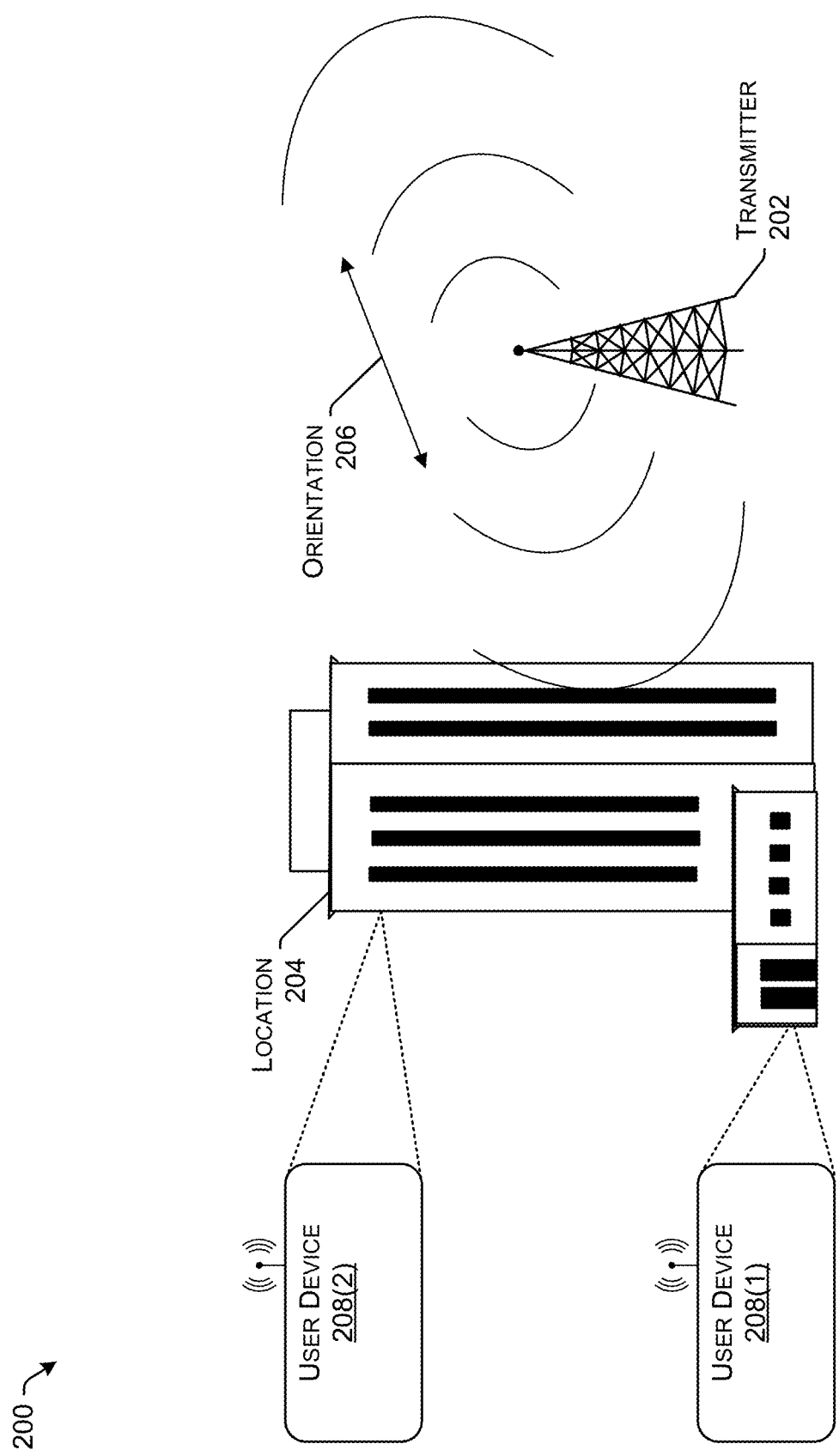
FIG. 2 illustrates an example environment including a transmitter of a network providing network coverage at a location.

FIG. 2 illustrates an example transmitter 202 configured to transmit and/or receive a signal at a location 204. In some instances, the transmitter 202 can be configured to transmit and/or receive a signal in an orientation 206. By way of example and without limitation, the orientation 206 can be directed toward a lower portion of a building at location 204. For example, a carrier associated with the transmitter 202 can determine to prioritize a lower portion of the building at location 204 and/or deprioritize an upper portion of the building at location 204. Therefore, during a configuration of the transmitter 202, the carrier can configure the transmitter 202 to have orientation 206 which can provide a stronger signal at the lower portion of the building compared to the upper portion of the building.

Therefore, by way of example and without limitation, a user device 208(1) can connect to a network associated with the transmitter 202 at location 204 in a lobby of a building. Additionally, a user device 208(2) can connect to the network associated with the transmitter 202 at location 204 at an observation deck of the building. The user device 208(1) can receive a signal from the transmitter 202 can receive a stronger signal (or a signal with improved metrics) compared to a user device 208(2). As discussed above, user device 208(1) and 208(2) can collect network data associated with the signal and transmit the network data to a network device similar to network device(s) 116.

Figure 3:
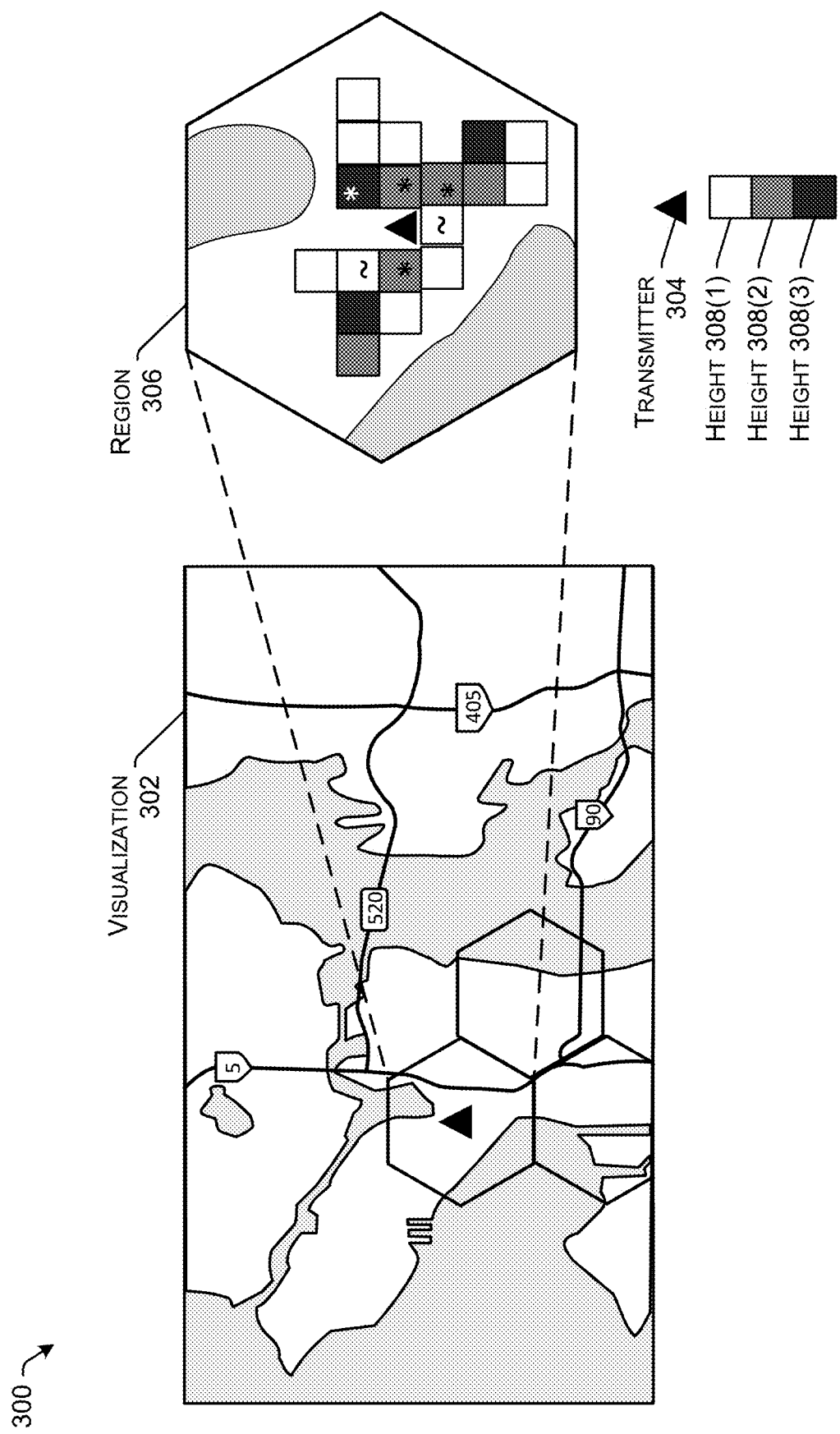
FIG. 3 illustrates an example visualization of network data associated with various locations of an environment.

FIG. 3 illustrates an example visualization of data 300 including data captured using user devices, as discussed herein. In some instances, the visualization 302 can be generated by the aggregation component 120, as discussed herein.

In some instances, visualization 302 can represent network data that includes data associated with a transmitter 304, a region 306 associated with the transmitter 304, and/or height data associated with the region 306 in an environment. Further, the visualization 302 can represent various data, which can correspond to aggregated data and/or individual metrics collected by user devices, as discussed herein. As discussed above, the visualization 302 can represent various regions such as region 306. The region 306 can include and represent network data related to a sub-region, a building, a set of buildings, etc. For example, the region 306 can include data indicating different heights such as height 308(1), 308(2), and 308(3) associated with different portions of the region 306. In some instances, network device(s) (such as network device(s) 116) can receive network data from user device(s) (such as user device(s) 102).

The network data can include signal strength information comprising one or more metrics, such as RSSI, RSRP, RSRQ, SINR, MCC, MNC, network type, etc., as determined by the user device(s). In some instances, the visualization 302 can include an indication of the one or more metrics associated with one or more of the regions. For example, a relatively high RSSI metric can be represented in the visualization 302, corresponding to the symbol "*". In some examples, a relatively lower RSSI metric can be represented in the visualization 302, corresponding to the symbol "~". In some instances, the network data can include altitude data. By way of example and without limitation, the network data can include one or more metrics associated with a first location associated with a height 308(1) and one or more metrics associated with a second location associated with a height 308(2). In some instances, the visualization 302 can also include an indication of call density for one or more of the regions. For example, the region 306 can depict a call density in addition, or alternatively, to height data. Therefore, the visualization 302 can be used to generate and/or update a three-dimensional coverage map associated with a carrier and/or network. Although not shown in FIG. 3, a call density can be associated with any of the regions. Additionally, it should be appreciated that any number of regions can be included in the visualization 302.

In some instances, the visualization 302 can be used, at least in part, to determine a network response (e.g., the network response 126 in FIG. 1). The network response can include a suggested location where to deploy additional base stations, to adjust a power associated with a base station and/or a transmitter, and/or to adjust a tilt or an angle of an antenna associated with a transmitter, to select a frequency band and/or radio access technology for a base station, and the like. In some instances, the size, shape, location, call density, or other information associated with the region 306 can be used to determine a network response for augmenting the infrastructure of the telecommunications network.

Figure 4:
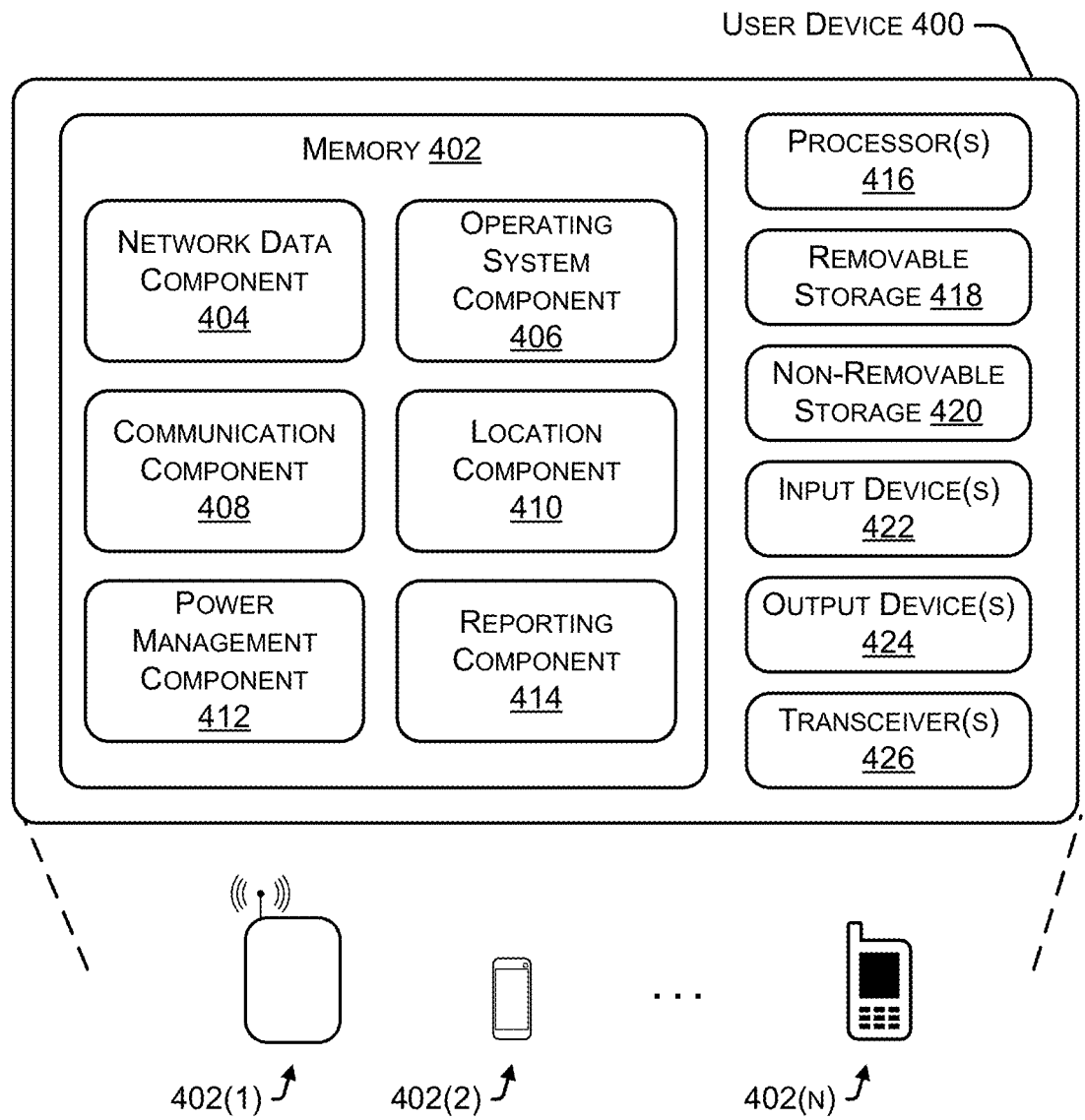
FIG. 4 illustrates an example user device configured to capture and transmit network data in accordance with embodiments of the disclosure.

FIG. 4 illustrates an example user device 400 configured to implement the network data component and the location component, in accordance with embodiments of the disclosure. In some embodiments, the user device 400 can correspond to the user device 102 of FIG. 1. It is to be understood in the context of this disclosure that the user device 400 can be implemented as a single device or as a plurality of devices with components and data distributed among them. By way of example, and without limitation, the user device 400 can be implemented as various user devices 102(1), 102(2), . . . , 102(N).

As illustrated, the user device 400 comprises a memory 402 storing a network data component 404, an operating system component 406, a communication component 408, a location component 410, a power management component 412, and a reporting component 414. Also, the user device 400 includes processor(s) 416, a removable storage 418 and non-removable storage 420, input device(s) 422, output device(s) 424, and transceiver(s) 426.

In various embodiments, memory 402 is volatile (such as RAM), non-volatile (such as ROM, flash memory, etc.) or some combination of the two. The network data component 404, the operating system component 406, the communication component 408, the location component 410, the power management component 412, and the reporting component 414 stored in the memory 402 can comprise methods, threads, processes, applications or any other sort of executable instructions. The network data component 404, the operating system component 406, the communication component 408, the location component 410, the power management component 412, and the reporting component 414 can also include files and databases.

The network data component 404 can include functionality to determine one or more metrics associated with a signal received, detected, or otherwise monitored by the user device 400. For example, the network data component 404 can determine metrics including but not limited to RSSI, RSRP, RSRQ, SINR, power density and the like for a specific bandwidth in the frequency domain. The network data component 404 can instruct the operating system component to control software and/or hardware associated with a transceiver of the user device 400 to monitor conditions at the user device 400 and to provide metrics (e.g., information about location, network environment, call status, etc.) indicative of the conditions to a network server for subsequent analysis. In some instances, information can be associated with the metrics, such as the MCC/MNC (mobile country code/mobile network code) (e.g., indicative of a carrier such as T-Mobile, AT&T, Commnet, etc.), geographical location of the user device 400 (including latitude/longitude/altitude and location accuracy), a cell identifier of a cell serving the user device 400, a location identifier of the cell, and the like. In some instances, the information may refer to service provider information and geolocation information. The service provider information may include any information associated with the service provider, such as the MCC, the MNC, the carrier name, and the like. The geolocation information may include any information associated with the location, such as an address, the location latitude, the location longitude, the location accuracy, the location altitude, the location identifier, the location area code, and the like. The network data component 404 can send the metrics to a network device to aggregate and analyze the metrics.

In some instances, the network data component 404 can receive a coverage index determined by the network device. As will be described herein with respect to network device 500, a coverage index can be determined for a location range or location area code (LAC) that can be associated with different heights. By way of example and without limitation, the coverage index can be determined for a location that indicates a ratio of a first set of calls to a second set of calls where the first set of calls had good signal quality at a lobby of a building and the second set of calls had poor signal quality at an observation deck of the building. In some instances, the good signal quality can be determined by the network device based on the network data meeting or exceeding a signal quality threshold and the poor signal quality can indicate that the network data does not meet or exceed the signal quality threshold.

In some instances, the network data component 404 can scan a frequency resource at any regular or irregular interval or can initiate a scan based on an internal or external trigger or command. For example, the network data component 404 can receive an instruction from the remote network device to initiate a scan. Additionally, the network data component 404 can initiate a rescan at a default time interval (e.g., every 1 hour). As discussed herein, the network data component 404 can receive an instruction from the remote network device to adjust the scan frequency from the default time interval to a shorten time interval (e.g., from every 1 hour to every half hour, or any other time interval(s)) based on a high coverage index. The network data component 404 can determine whether a coverage index is high or low based on one or more predetermined threshold range. In some instances, the network data component 404 can determine operating conditions or characteristics of the user device 400 (e.g., a power resource, location, etc.), and a command to initiate scanning can be based at least in part on those operating conditions or characteristics. In some instances, the network data component 404 can prevent rescans based on a low coverage index.

In some instances, the network data component 404 can be implemented as an application operating on the user device 400. In some instances, to initiate a scan of one or more frequency resources, the network data component 404 can call an API (application programming interface) implemented in the operating system component 406, for example.

In some instances, the network data component 404 can include functionality to present a user interface on the user device 400, for example, to receive an indication from a user enabling or disabling a network analyzer mode of the network data component 404. For example, in some instances, a user of the user device 400 can turn on or turn off the network data component 404 based on personal preferences, incentives from a service provider, inclusion in a voluntary program, and the like.

In some instances, the network data component 404 can correspond to the network data component 104 of FIG. 1.

The operating system component 406 can include functionality to query a chipset of the user device 400, and/or to query the transceiver(s) 426, to instruct the transceiver(s) 426 and/or any software or hardware to scan one or more channels or frequency resources to determine metrics associated with the channel or frequency resources, for example. In some instances, the operating system component 406 can include a first API to receive instructions from the network data component 404 and to provide data to the network data component 404, and a second API to issue instructions to software or hardware associated with a modem or the transceiver(s) 426 and to receive data from such components.

The communication component 408 can include functionality to conduct communications with one or more other devices, as discussed herein. In some instances, the communication component 408 can conduct a communication via a set of frequency resources associated with a carrier network. In some instances, the communication component 408 can take priority over resources of the user device 400 to conduct a communication. That is, if the network data component 404 initiates a scan of a frequency resource, and if the communication component 408 subsequently initiates a communication using the frequency resource or another frequency resource, in some instances, the communication component 408 can initiate the communication by interrupting the network data component 404. In some instances, other prioritization schemes may be used, and the communication component 408 can have any relative or absolute priority level.

The location component 410 can include functionality to determine a location of the user device 400. In some instances, the location component 410 can determine a location based at least in part on GPS location data, base station identity, Wi-Fi access point identity, third-party APIs, or a combination of location sources. In some embodiments, a location can include a mobile network code (MNC) and a mobile country code (MCC) used in combination to uniquely identify a mobile network carrier network. In some embodiments, the location component 410 can determine a base station or cell identity, and/or latitude, longitude, altitude information, and timestamp information. In some instances, the location can be determined in connection with determining one or more metrics associated with a signal or channel. In some instances, the location can be provided to a network device, for example, for aggregation and analysis. In some instances, the location component 410 can determine a location of the user device 400 relative to a location of a geofenced location. For example, the location component 410 can receive a geofenced location from a network device.

The power management component 412 can include functionality to determine a status and/or level of a power resource of the user device 400. For example, the power management component 412 can determine a remaining battery percentage, remaining charge, used charge, etc. to evaluate resources of the user device 400. Further, the power management component 412 can determine that the power resource is above or below a threshold value, for example, to determine whether the remaining amount of energy is sufficient for expected levels of activity. In some instances, a schedule for initiating scanning of frequency resources can be based at least in part on a power resource of the user device 400. For example, when a battery level is relatively high (and/or the user device 400 is connected to an external source of power) the scanning can be initiated more frequently than when a battery level is relatively low (and/or the user device 400 is not connected to external power). Of course, a variety of power management schemes can be used to initiate scanning based at least in part on available power resources.

The reporting component 414 can include functionality to store one or more metrics associated with one or more frequency resources and to send such metrics to a network device. In some instances, the reporting component 414 can send the one or more metrics to a network device as the one or more metrics are generated, captured, or determined. In some instances, the reporting component 414 can aggregate the metrics and send the aggregated metrics to the network device. In some instances, the reporting component 414 can send a reduced data set based on the network connection state of the user device 400 (e.g., when the user device 400 is connected via a weak signal or to a roaming network). In some instances, the reporting component 414 can send the metrics at a time of low network congestion (e.g., at night). In some instances, the reporting component 414 can transmit metrics in response to a query from a network device. In some instances, the reporting component 414 can encode the data sent to a network device such that a service provider tracking data usage does not count the data against a quota associated with the user device 400.

In some embodiments, the processor(s) 416 is a central processing unit (CPU), a graphics processing unit (GPU), or both CPU and GPU, or other processing unit or component known in the art.

The user device 400 also includes additional data storage devices (removable and/or non-removable) such as, for example, magnetic disks, optical disks, or tape. Such additional storage is illustrated in FIG. 4 by removable storage 418 and non-removable storage 420. Tangible computer-readable media can include volatile and non-volatile, removable and non-removable media implemented in any method or technology for storage of information, such as computer readable instructions, data structures, program modules, or other data. Memory 402, removable storage 418 and non-removable storage 420 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user device 400. Any such tangible computer-readable media can be part of the user device 400.

In various embodiments, the user device 400 can include applications including but are not limited, a web browser application, a video streaming application, an online gaming application, a network analyzer, and the like. During execution on the user device 102, each of the applications may be configured to cause the user device 102 to initiate data communications with the network device(s) 116 over the network(s) 118.

The user device 102 may be configured to communicate over a telecommunications network using any common wireless and/or wired network access technology. Moreover, the user device 102 may be configured to run any compatible device operating system (OS), including but not limited to, Microsoft Windows Mobile, Google Android, Apple iOS, Linux Mobile, as well as any other common mobile device OS.

The user device 400 also can include input device(s) 422, such as a keypad, a cursor control, a touch-sensitive display, voice input device, etc., and output device(s) 424 such as a display, speakers, printers, etc. These devices are well known in the art and need not be discussed at length here.

As illustrated in FIG. 4, the user device 400 also includes one or more wired or wireless transceiver(s) 426. For example, the transceiver(s) 426 can include a network interface card (NIC), a network adapter, a LAN adapter, or a physical, virtual, or logical address to connect to various network(s) 118, or to the network device(s) 116, for example. To increase throughput when exchanging wireless data, the transceiver(s) 426 can utilize multiple-input/multiple-output (MIMO) technology. The transceiver(s) 426 can comprise any sort of wireless transceivers capable of engaging in wireless, radio frequency (RF) communication. The transceiver(s) 426 can also include other wireless modems, such as a modem for engaging in Wi-Fi, WiMax, Bluetooth, infrared communication, and the like.

In some instances, the transceiver(s) 426 can correspond to the transceiver(s) 108 of FIG. 1.

Figure 5:
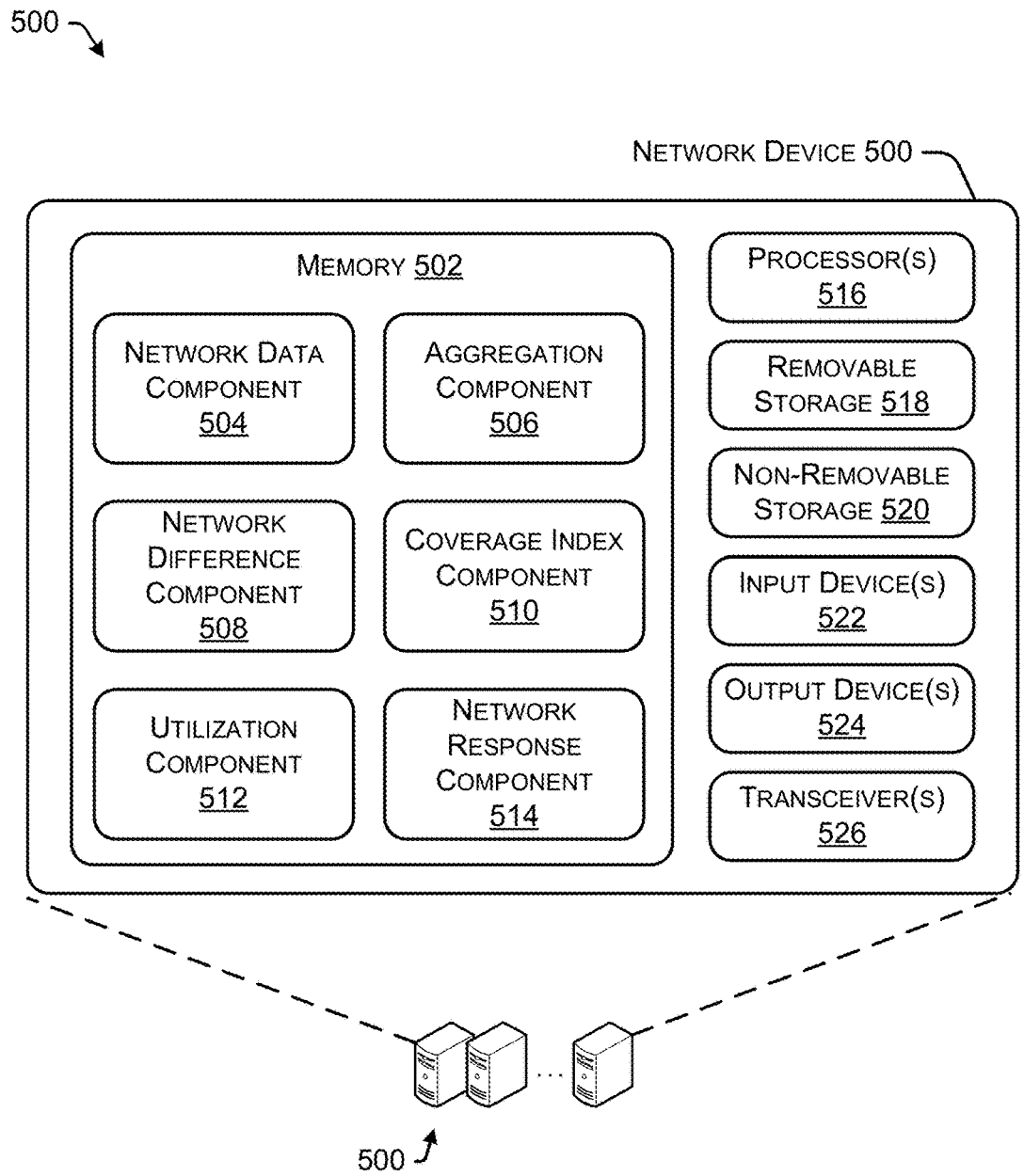
FIG. 5 illustrates an example network device configured to receive network data captured by a user device, in accordance with embodiments of the disclosure.

FIG. 5 illustrates an example network device 500 configured to receive network data captured/generated by a user device, in accordance with embodiments of the disclosure. In some embodiments, the network device 500 can correspond to the network device 116 of FIG. 1. It is to be understood in the context of this disclosure that the network device 500 can be implemented as a single device or as a plurality of devices with components and data distributed among them.

As illustrated, the network device 500 comprises a memory 502 storing a network data component 504, an aggregation component 506, a network difference component 508, a coverage index component 510, a utilization component 512, and a network response component 514. Also, the network device 500 includes processor(s) 516, a removable storage 518 and non-removable storage 520, input device(s) 522, output device(s) 524, and transceiver(s) 526.

In various embodiments, the memory 502 is volatile (such as RAM), non-volatile (such as ROM, flash memory, etc.) or some combination of the two. The network data component 504, the aggregation component 506, the network difference component 508, the coverage index component 510, the utilization component 512, and the network response component 514 stored in the memory 502 can comprise methods, threads, processes, applications or any other sort of executable instructions. The network data component 504, the aggregation component 506, the network difference component 508, the coverage index component 510, the utilization component 512, and the network response component 514 can also include files and databases.

The network data component 504 can include functionality to receive network data determined and/or captured by a user device, as discussed herein. As discussed above, the network data determined and/or captured by the user device can include RSSI, RSRP, RSRQ, SINR, power density, information about location, network environment, call status, and the like. Additionally, the network data can be associated with a location including an altitude.

In some instances, the network data component 504 can access elevation data associated with a region. The elevation data can indicate, for example, a sea level associated with the region, a ground elevation level associated with the region, and/or construction data indicating an average floor height of a building. Based on the ground elevation data, the network data component 504 can determine floor data indicating an estimated floor, level, and/or height associated with a capture of the network data by a user device. The network data component 504 can associate the floor data with the network data and transmit the floor data to the aggregation component 506.

The aggregation component 506 can include functionality store the metrics in a database as aggregated metrics and/or aggregated coverage indices. In some instances, the metrics can be indexed by location, time, user device, and the like. In some instances, the aggregation component 506 can perform any statistical analysis on the metrics to determine a variety of signal characteristics. For example, the aggregation component 506 can determine a signal type (e.g., TV, radio, cell phone, etc.) as well as quantitate or qualitative characteristics of the signal.

In some instances, the aggregation component 506 can correspond to the aggregation component 120 of FIG. 1.

The network difference component 508 can determine a difference in metrics associated with a region at different altitudes. For example, the network difference component 508 can index the metrics stored at the aggregation component 506 based on, a transmitter, a region, etc. and compare the metrics associated with a region at a first altitude with the metrics associated with the region at a second altitude. By way of example and without limitation, a user device can capture network data associated with a location at a lobby of a building and the same user device and/or a different device can capture network data associated with an observation deck of the building. The network data can be transmitted to the network device 500 and, in some instances, the network difference component 508 can determine a difference between the network data associated with the lobby and the network data associated with the observation deck. The difference can indicate a difference in RSSI, RSRP, RSRQ, SINR, and the like.

The coverage index component 510 can include functionality to determine the coverage index for a location range or location area code (LAC), as discussed herein, based on the network data. In some instances, the coverage index component 510 can determine the number of calls served by the service provider for a location area code (LAC) at one or more heights. The LAC may include multiple cells. The coverage index component 510 can determine a first number of calls from user device at a first height and a second number of calls from user device at a second height. In some instances, the coverage index component 510 can determine the number of calls based on indexing the network data stored at the aggregation component 506. The first number of calls can be associated with network data and/or signal quality that meets or exceeds a threshold and the second number of calls can be associated with network data and/or signal quality that does not meet or exceed the threshold. In further examples, the coverage index component 510 can determine the coverage index based on a first number of calls associated with network data and/or signal quality that meets or exceeds the threshold and a second number of total calls associated with the region of interest (e.g., LAC).

By way of example and without limitation, in a first LAC with 200 calls, where 150 calls were associated with a first signal strength that meets or exceeds a signal strength threshold and 50 calls associated with a second signal strength that does not meet or exceed the signal strength threshold, the coverage index would be 75%. In a second LAC, with 100 calls, where 20 were associated with a third signal strength that meets or exceed s the signal strength threshold and 80 were associated with a fourth signal strength that does not meet or exceed the signal strength thershold, the coverage index would be 20%. Relative to the first LAC, the first coverage index would be considered "high" while the second coverage index would be considered "low." In some instances, such "high" and "low" can be considered to be relative terms and/or can be considered with respect to a threshold value. For instance, the threshold may be 50%, and a coverage index that is equal to 50% or lower may be "low," while a coverage index above 50% may be "high." Although the coverage index is expressed at a percentage here, it can be any numeric expression, including fraction.

In additional examples, the coverage index component 510 can send the coverage index to a user device that is connected to a roaming cell in the region of interest, as discussed herein. In examples, the coverage index component 510 can generate recommendations to increase coverage for areas with a low coverage index, which may include changing a direction of an antenna, adjusting power, and/or installing additional base stations to increase coverage, as discussed herein. The changing a direction of an antenna can be referred to as a "tilt" and may include rotating the antenna to change the direction of broadcast for the antenna or tilting the antenna to change the angle of the antenna with respect to a ground.

The utilization component 512 can interact with the aggregation component 506 and include functionality to analyze the aggregated metrics to estimate a utilization of a location range or location area code (LAC), as discussed herein. In some instances, the utilization component 512 can determine a utilization index (or utilization rate) associated with a carrier based on the area code, and the aggregated metrics can be indexed by LAC, MCC/MNC identifying the carrier, the number of calls served by the carrier in the area, the total number of calls served in the area, and the like. In further examples, the utilization component 512 can determine the utilization index based on a number of calls served by the carrier network and an estimated capacity associated with the LAC. For instance, a carrier can, based on a type of base station, a telecommunication technology, and the like, determine an estimated capacity associated with a transmitter and/or an LAC. Then the utilization component 512 can determine the number of calls and/or an amount of bandwidth use associated with one or more transmitters of the LAC and determine the utilization index where a predetermined threshold range can indicate a high utilization index (indicating that the use of the available capacity is high) or a low utilization index (indicating that the use of the available capacity is low).

In some instances, utilization component 512 can perform any statistical analysis on the metrics, utilization index, and/or coverage index to evaluate roaming contracts to determine if such contracts are needed and/or to adjust a scope (region size) of the roaming contract to reduce business expenses.

The network response component 514 can interact with the coverage index component 510 and the utilization component 512 to determine a network response or network action. For example, the network response component 514 can determine types of responses based on, for example, the coverage index and or the utilization index. In some instances, the network response component 514 can determine a network response based on a distance between network data associated with different heights, a distance between a location associated with the coverage index and a transmitter, and/or a telecommunication technology associated with the transmitter. In some instances, the network response component 514 can determine to install an additional base station (e.g., a low frequency base station, a high frequency base station, etc.). By way of example and without limitation, the network response component 514 can identify network data associated with a region and determine that the network data indicates a signal strength that meets or exceeds a signal strength threshold but does not meet or exceed a capacity threshold. Additionally, the network response component 514 can determine that the utilization associated with the region is high. Based on the signal strength and the utilization, the network response component 514 can determine a network response that includes an installation of a high-frequency base station (e.g., a small cell base station and/or a millimeter wave base station).

By way of an additional example and without limitation, the network response component 514 can determine that the network data indicates that the signal strength does not meet or exceed a signal strength threshold and that the utilization associated with the region is high. Based on the signal strength and the utilization, the network response component 514 can determine a network response that includes an installation of a macro cell base station.

By way of an additional example and without limitation, the network response component can determine that the network data indicates that the signal strength meets or exceeds a signal strength threshold and that the utilization is low. Based on the signal strength and the utilization, the network response component 514 can determine a deprioritization status associated with the region as the region is provided with sufficient coverage.

The network response can include a suggested location where to deploy additional base stations, in addition to adjust a power associated with a base station and/or a transmitter, and/or to adjust a tilt or an angle of an antenna associated with a transmitter, for example.

In some embodiments, the processor(s) 516 is a central processing unit (CPU), a graphics processing unit (GPU), or both CPU and GPU, or other processing unit or component known in the art.

The network device 500 also includes additional data storage devices (removable and/or non-removable) such as, for example, magnetic disks, optical disks, or tape. Such additional storage is illustrated in FIG. 5 by removable storage 518 and non-removable storage 520. Tangible computer-readable media can include volatile and nonvolatile, removable and non-removable media implemented in any method or technology for storage of information, such as computer readable instructions, data structures, program modules, or other data. Memory 502, removable storage 518 and non-removable storage 520 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by the network device 500. Any such tangible computer-readable media can be part of the network device 500.

The network device 500 can include input device(s) 522, such as a keypad, a cursor control, a touch-sensitive display, etc. Also, the network device 500 can include output device(s) 524, such as a display, speakers, etc. These devices are well known in the art and need not be discussed at length here.

As illustrated in FIG. 5, the network device 500 can include one or more wired or wireless transceiver(s) 526. In some wireless embodiments, to increase throughput, the transceiver(s) 526 can utilize multiple-input/multiple-output (MIMO) technology. The transceiver(s) 526 can be any sort of wireless transceivers capable of engaging in wireless, radio frequency (RF) communication. The transceiver(s) 526 can also include other wireless modems, such as a modem for engaging in Wi-Fi, WiMax, Bluetooth, infrared communication, or the like.

Figure 6:
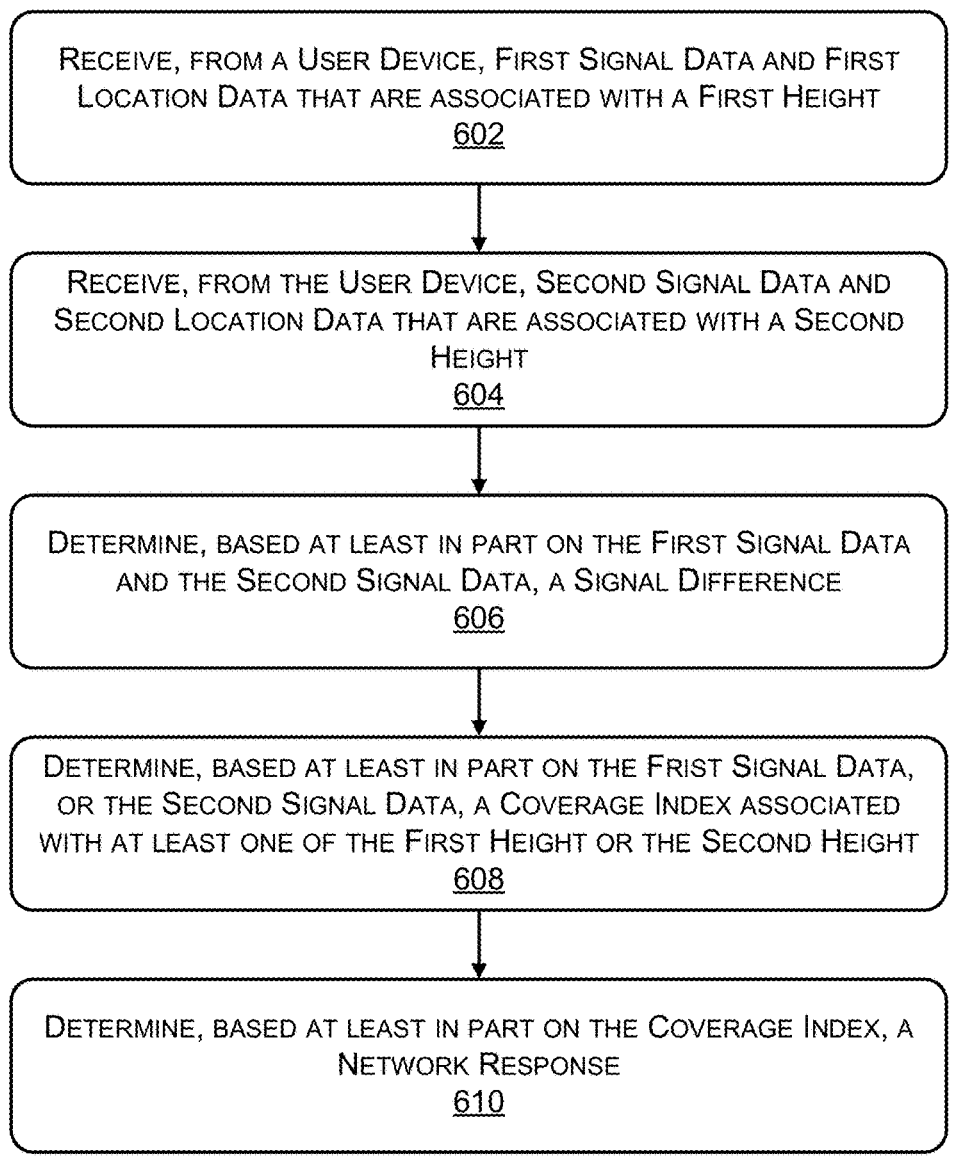
FIG. 6 illustrates an example process for receiving network data, determining a coverage index based on the network data, and determining a network response, as described herein.

FIG. 6 illustrates an example process in accordance with embodiments of the disclosure. This process is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 6 illustrates an example process 600 for receiving signal data and determining a network response based on the signal data, as described herein. The example process 600 can be performed by the network device(s) 116 and 500 (or another component), in connection with the user device 102 and 400 (or another component), and other components discussed herein. Some or all of the process 600 can be performed by one or more devices, equipment, or components illustrated in FIGS. 1, 4 and 5, for example.

At operation 602, the process 600 can include receiving, from a user device, first signal data and first location data that are associated with a first height. In some instances, the operation 602 can be performed by the user device using the network data component 104 or 404, for example. In some instances, the signal data can include one or more metrics associated with a signal received, detected, or otherwise monitored by the user device 400. For example, the network data component 404 can determine metrics including but not limited to RSSI, RSRP, RSRQ, SINR, power density and the like for a specific bandwidth in the frequency domain. In some instances, the network data component 404 can determine metrics associated with call information, such as the MCC/MNC (mobile country code/mobile network code) (e.g., indicative of a carrier such as T-Mobile, AT&T, Commnet, etc.), geographical location of the user equipment (including latitude/longitude and location accuracy), a cell identifier of a cell serving the user equipment, a location identifier of the cell, and the like.

At operation 604, the process 600 can include receiving, from the user device, second signal data and second location data that are associated with a second height. As discussed herein, the user device can monitor conditions at the user equipment and provides metrics (e.g., information about location, network environment, call status, etc.) indicative of the conditions to a network server for subsequent analysis. The signal data can include, but are not limited to, one or more of RSSI, RSRP, RSRQ, SINR, channel identifier, channel frequency, timing information (e.g., delay), and the like. In some instances, the one or more metrics can also include information associated with the user device, including but not limited to, one or more of a user device identifier, antenna capabilities, software version, hardware version, amount of power consumed, number of measurements, and the like. Additionally, the operation 604 can receive a plurality of metrics and store the metrics in a database. In some instances, the metrics can be aggregated and indexed by location, time, user equipment, and the like.

At operation 606, the process 600 can include determining, based at least in part on the first signal data and the second signal data, a signal difference. In some instances, the operation 606 can be performed by the network device using the network difference component 508, for example. The operation 606 can include functionality to analyze the aggregated metrics to determine a signal difference coverage for a location range or location area code (LAC), as discussed herein. For example, the network device can determine a difference in the signal data associated with a location and/or a region that differs in height. By way of example and without limitation, the first signal data can be associated with a lobby of a building and the second signal data can be associated with an observation deck of the building. A difference in the signal data between the first signal data and the second signal data can indicate a different level of coverage from one height to a different height.

At operation 608, the process can include determining a coverage index associated with at least one of the first height or the second height. For example, the operation 608 can include functionality to determine the coverage index for a height at a location range or location area code (LAC), as discussed herein. In some instances, the operation 608 can determine the number of calls served by the service provider for a location area code (LAC). The LAC may include multiple cells. The operation 608 can include determining a first number of calls from user device at a first height and a second number of calls from user device at a second height. The first number of calls can be associated with network data and/or signal quality that meets or exceeds a threshold and the second number of calls can be associated with network data and/or signal quality that does not meet or exceed the threshold. In further examples, the operation 608 can include determining the coverage index based on a first number of calls associated with network data and/or signal quality that meets or exceeds the threshold and a second number of total calls associated with the region of interest (e.g., LAC). As discussed above, the coverage index can be associated with the first height based on, for example, the first signal data, and/or associated with the second height based on, for example, the second signal data.

At operation 610, the process 600 can include determining a network response based at least in part on the coverage index. For example, the operation 610 can include using the network response component 514 to determine a network response that can include a suggested location where to deploy additional base stations, to adjust a power associated with a base station and/or a transmitter, and/or to adjust a tilt or an angle of an antenna associated with a transmitter, for example. Therefore, in examples, the operation 610 can generate recommendations to increase coverage for areas with a low coverage index, which may include changing a direction of an antenna, adjusting power, and/or installing additional base stations to increase coverage, as discussed herein.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors;
   a memory; and
   one or more components stored in the memory and executable by the one or more processors to perform operations comprising:
      receiving signal data associated with a height and a location of a user device;
      determining, based at least in part on the signal data, a coverage index associated with the height and the location, the coverage index indicating a number of calls served for a location area code (LAC) at the height and the location;
      determining a utilization rate associated with the height and the location; and
      determining, based at least in part on the utilization rate and the coverage index, a network response associated with a base station, wherein the base station is associated with the location and the network response comprises at least one of:
      adjusting a signal strength associated with the base station; or
      adjusting an antenna angle associated with the base station.

2. The system of claim 1, wherein the signal data is associated with a communication serviced by the base station.

3. The system of claim 1, wherein the operations further comprise:
   determining an aggregated coverage index associated with one or more other user devices; and
   determining, based at least in part on the aggregated coverage index, a threshold utilization rate.

4. The system of claim 3, wherein determining the network response comprises:
   comparing the utilization rate to the threshold utilization rate; and
   determining, based at least in part on comparing the utilization rate to the threshold utilization rate, at least one of:
      a high frequency base station installation action;
      a low frequency base station installation action;
      a prioritization action associated with the height and the location; or
      a deprioritization action associated with the height and the location.

5. The system of claim 1, wherein the operations further comprise:
   determining ground elevation data associated with the location; and
   determining, based at least in part on the ground elevation data, a floor level associated with the height.

6. The system of claim 1, wherein the operations further comprise:
   updating, based at least in part on the coverage index, a three-dimensional coverage map of a network.

7. The system of claim 1, wherein the base station comprises at least one of a small cell base station, a millimeter wave base station, or a macro cell base station.

8. The system of claim 1, wherein the height comprises a first height, the number of calls comprises a first number of calls, and the user device comprises a first user device, the operations further comprising:
   determining, based at least in part on the coverage index, a second number of calls served for the LAC by a second user device at a second height; and
   determining that at least one of the first number of calls or the second number of calls is associated with a signal quality that fails to meet or exceed a threshold value.

9. A method comprising:
   receiving network data associated with a network parameter of a user device at a height and location;
   determining, based at least in part on the network data, a coverage index associated with the height and the location, the coverage index indicating a number of calls served for a location area code (LAC) at the height and the location;

determining a utilization rate associated with the height and the location; and determining, based at least in part on the utilization rate and the coverage index, a network response associated with one or more base stations, wherein the one or more base stations are associated with the location and the network response comprises at least in part adjusting a signal strength associated with the one or more base stations.

10. The method of claim 9, wherein the network data is first network data and wherein the height is a first height, the method further comprising:

receiving second network data associated with the network parameter of the user device at a second height and the location; and determining a network difference between the first network data and the second network data, wherein determining the network response is further based at least in part on the network difference.

11. The method of claim 9, further comprising:

determining that the coverage index is below a coverage index threshold, wherein determining the network response is further based at least in part on determining that the coverage index is below the coverage index threshold.

12. The method of claim 11, wherein the coverage index indicates at least one of a signal strength, a signal to noise ratio, a bandwidth, or a latency.

13. The method of claim 9, further comprising:

determining an aggregated coverage index associated with one or more other user devices; and determining, based at least in part on the aggregated coverage index, a threshold utilization rate.

14. The method of claim 13, wherein determining the network response comprises:

comparing the utilization rate to the threshold utilization rate; and determining, based at least in part on comparing the utilization rate to the threshold utilization rate, at least one of:

a high frequency base station installation action;

a low frequency base station installation action;

a prioritization action associated with the height; or a deprioritization action associated with the height.

15. The method of claim 9, further comprising:

identifying, based at least in part on the network data, the one or more base stations, wherein the network response further comprises adjusting an antenna angle associated with the one or more base stations.

16. A system comprising:

one or more processors;

a memory; and one or more components stored in the memory and executable by the one or more processors to perform operations comprising:

receiving, from a user device, signal data and location data that are associated with a height;

determining, based at least in part on the location data, a location;

determining, based at least in part on the signal data, a coverage index associated with the height, the coverage index indicating a number of calls served for a location area code (LAC) at the height;

determining a utilization rate associated with the height; and determining, based at least in part on the coverage index and the utilization rate, a network response for a base station associated with the height and a location, wherein the network response comprises at least in part adjusting an antenna angle associated with the base station.

17. The system of claim 16, wherein determining the network response comprises:

comparing the utilization rate to a threshold utilization rate; and determining, based at least in part on comparing the utilization rate to the threshold utilization rate, at least one of:

a high frequency base station installation action;

a low frequency base station installation action;

a prioritization action associated with the height; or a deprioritization action associated with the height.

18. The system of claim 16, the operations further comprising:

determining an aggregated coverage index associated with the location data;

determining ground elevation data associated with the location data;

determining, based at least in part on the ground elevation data, first building floor data associated with the height; and comparing the first building floor data with second building floor data associated with at least a portion of the aggregated coverage index.

19. The system of claim 16, wherein the operations further comprise:

identifying, based at least in part on the location data, the base station, wherein the network response further comprises adjusting a signal strength associated with the base station.

20. The system of claim 16, wherein the operations further comprise:

updating, based at least in part on the coverage index, a three-dimensional coverage map of a network.

* * * * *